US011399023B2

(12) United States Patent
Vasseur et al.

(10) Patent No.: US 11,399,023 B2
(45) Date of Patent: Jul. 26, 2022

(54) REVISITING DEVICE CLASSIFICATION RULES UPON OBSERVATION OF NEW ENDPOINT ATTRIBUTES

(71) Applicant: Cisco Technology, Inc., San Jose, CA (US)

(72) Inventors: Jean-Philippe Vasseur, Saint Martin D'uriage (FR); Pierre-André Savalle, Rueil-Malmaison (FR); Grégory Mermoud, Veyras VS (CH); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 16/854,115

(22) Filed: Apr. 21, 2020

(65) Prior Publication Data

US 2021/0328986 A1 Oct. 21, 2021

(51) Int. Cl.
*H04L 9/40* (2022.01)
*G06N 20/00* (2019.01)
*G06F 16/28* (2019.01)

(52) U.S. Cl.
CPC ........ *H04L 63/0876* (2013.01); *G06F 16/285* (2019.01); *G06N 20/00* (2019.01); *H04L 63/20* (2013.01)

(58) Field of Classification Search
None
See application file for complete search history.

(56) References Cited

U.S. PATENT DOCUMENTS

| | | | |
|---|---|---|---|
| 8,125,908 B2 | 2/2012 | Rothstein et al. | |
| 9,923,918 B2 | 3/2018 | Nicodemus et al. | |
| 10,079,859 B2 | 9/2018 | Lang et al. | |
| 10,382,459 B2 | 8/2019 | Harris et al. | |
| 2018/0278486 A1* | 9/2018 | Mermoud | H04L 41/16 |
| 2019/0138938 A1* | 5/2019 | Vasseur | H04L 41/147 |

OTHER PUBLICATIONS

Sivanathan, Arunan, "IoT Behavioral Monitoring via Network Traffic Analysis", School of Electrical Engineering and Telecommunications, UNSW Dissertaion, Sep. 2019, 180 pages, Australia.

* cited by examiner

*Primary Examiner* — Cai Y Chen
(74) *Attorney, Agent, or Firm* — Behmke Innovation Group LLC; Kenneth J. Heywood; Jonathon P. Western

(57) ABSTRACT

In various embodiments, a device classification service uses an initial device classification rule to label each of a set of endpoint devices in a network as being of a particular device type. The device classification service identifies a particular attribute exhibited by at least a portion of the set of endpoint devices and was not previously used to generate the initial device classification rule. The device classification service generates one or more new device classification rules based in part on the particular attribute. The device classification service switches from using the initial device classification rule to label endpoint devices in the network to using the one or more new device classification rules to label endpoint devices in the network.

20 Claims, 10 Drawing Sheets

REVISITING DEVICE CLASSIFICATION RULES UPON OBSERVATION OF NEW ENDPOINT ATTRIBUTES

TECHNICAL FIELD

The present disclosure relates generally to computer networks, and, more particularly, to revisiting device classification rules upon observation of new endpoint attributes.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
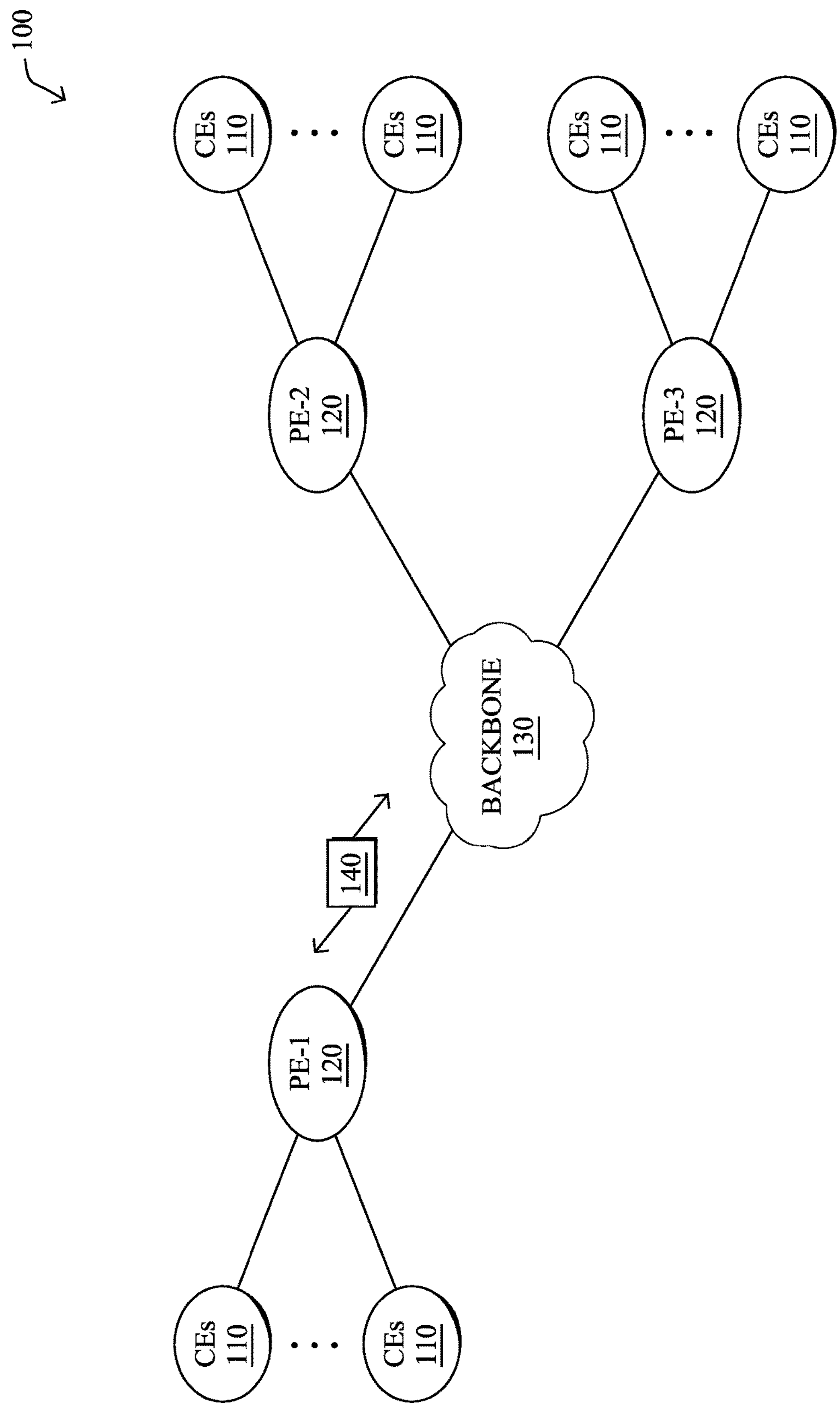
FIGS. 1A-1B illustrate an example communication network.

According to one or more embodiments of the disclosure, a device classification service uses an initial device classification rule to label each of a set of endpoint devices in a network as being of a particular device type. The device classification service identifies a particular attribute exhibited by at least a portion of the set of endpoint devices and was not previously used to generate the initial device classification rule. The device classification service generates one or more new device classification rules based in part on the particular attribute. The device classification service switches from using the initial device classification rule to label endpoint devices in the network to using the one or more new device classification rules to label endpoint devices in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
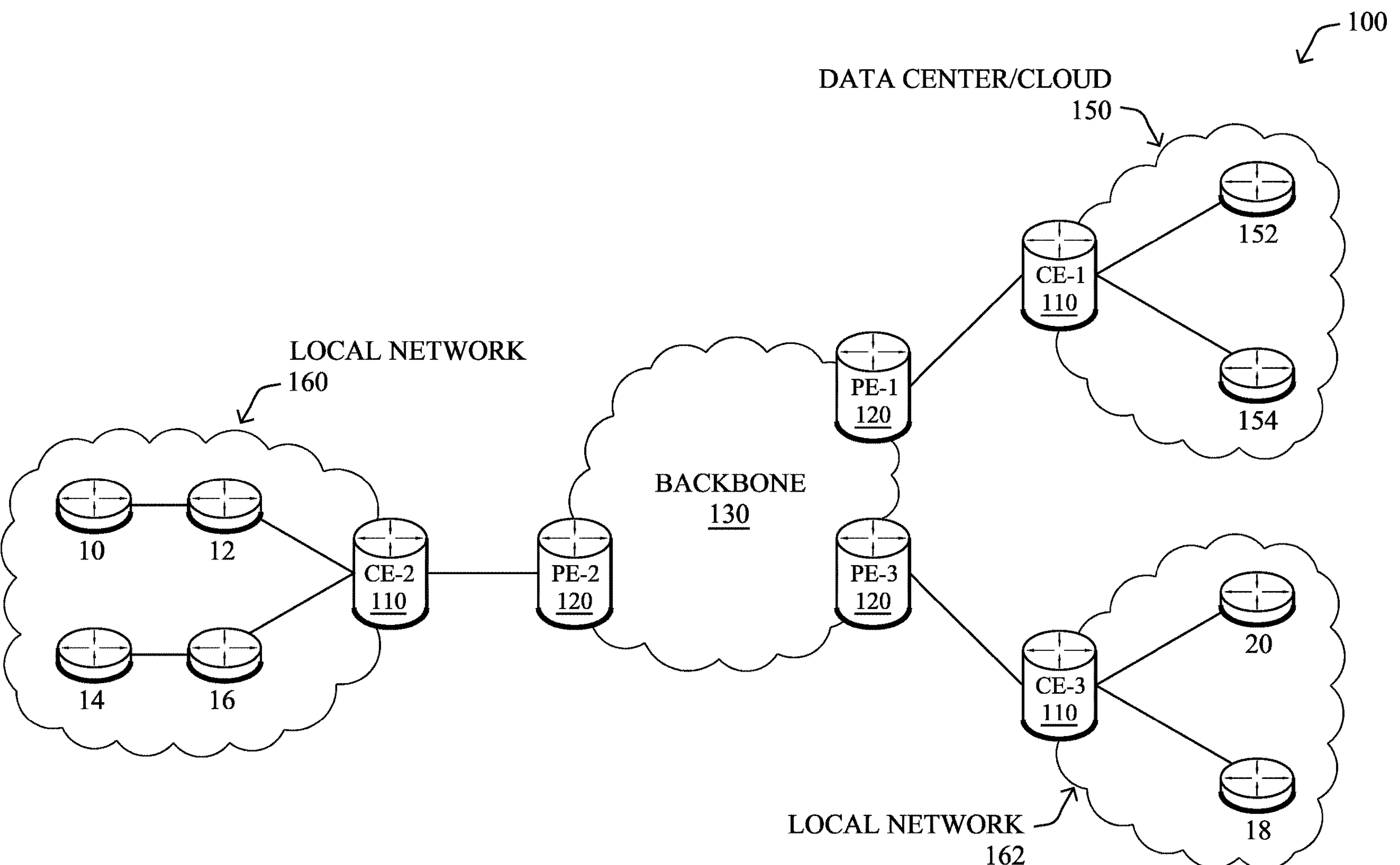

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
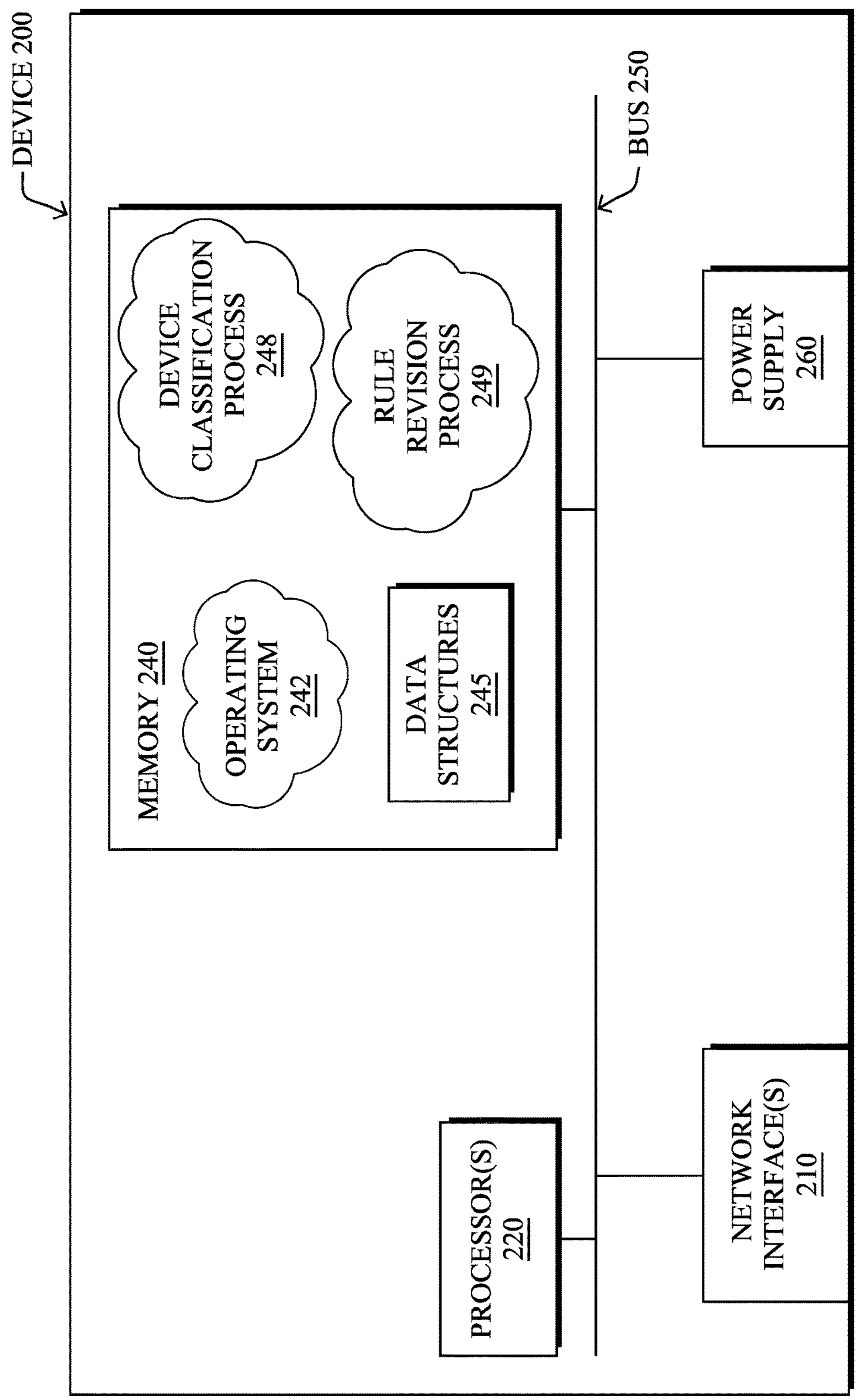
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a rule revision process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
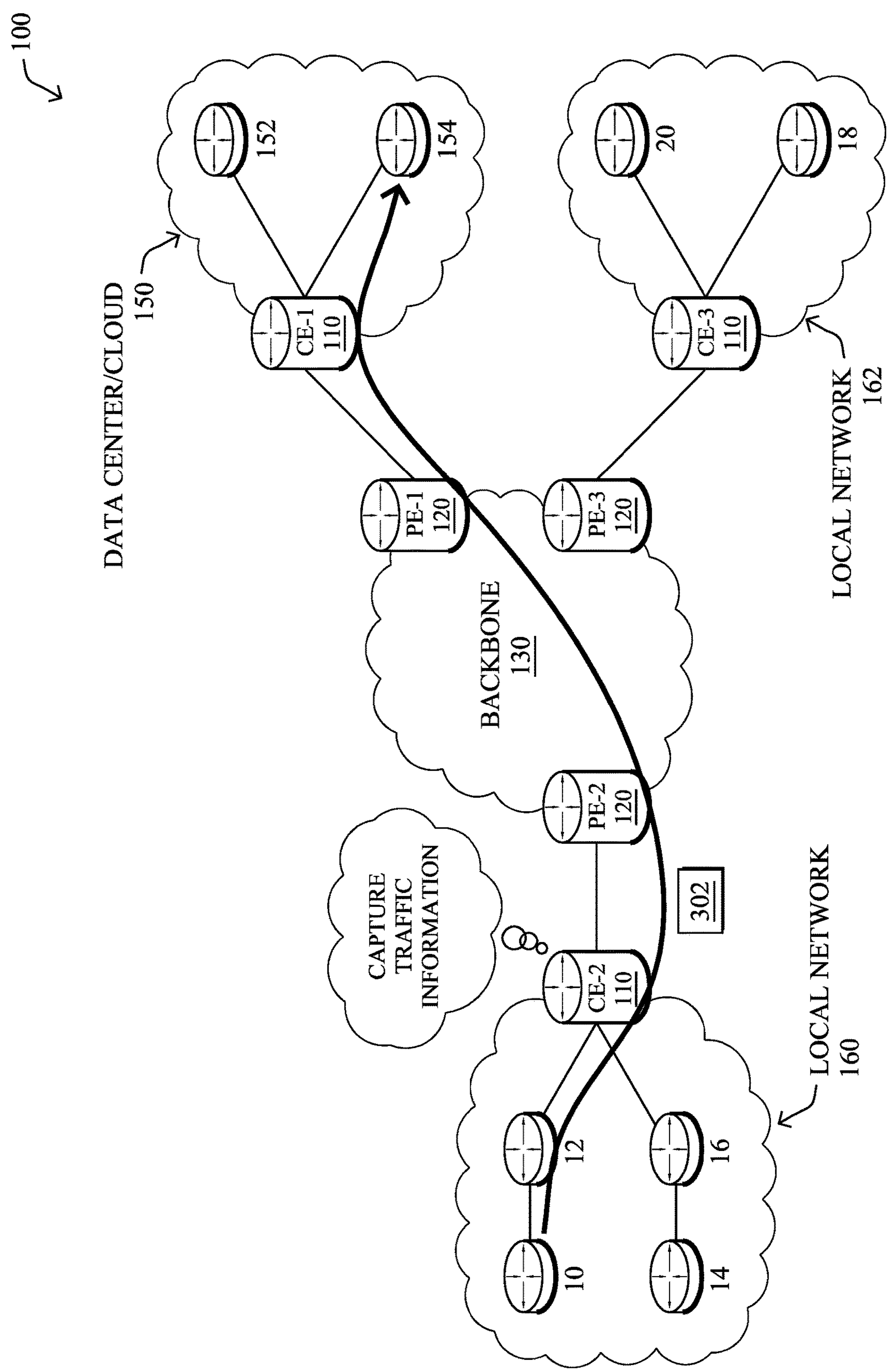
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
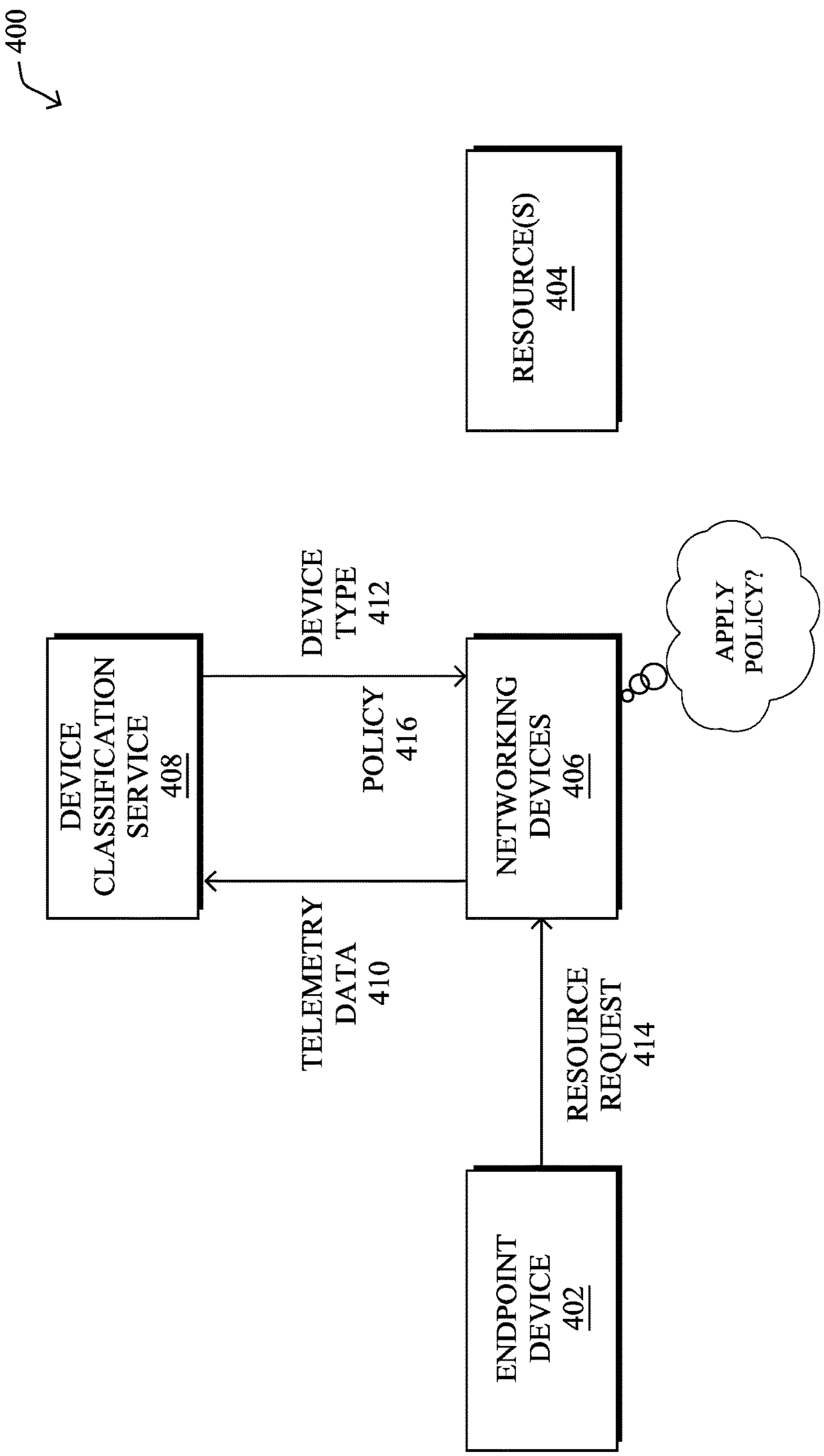
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that comprises one or more servers or other devices, such as networking devices 406, or be in communication therewith. Service 408 may, for example, be provided through the execution of device classification process 248, described above (e.g., in conjunction with rule revision process 249). In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

- DHCP probes with helper addresses
- SPAN probes, to get messages in INIT-REBOOT and SELECTING states, use of ARP cache for IP/MAC binding, etc.
- Netflow probes
- HTTP probes to obtain information such as the OS of the device, Web browser information, etc.
- RADIUS probes
- SNMP to retrieve MIB object or receives traps
- DNS probes to get the Fully Qualified Domain Name (FQDN)
- etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
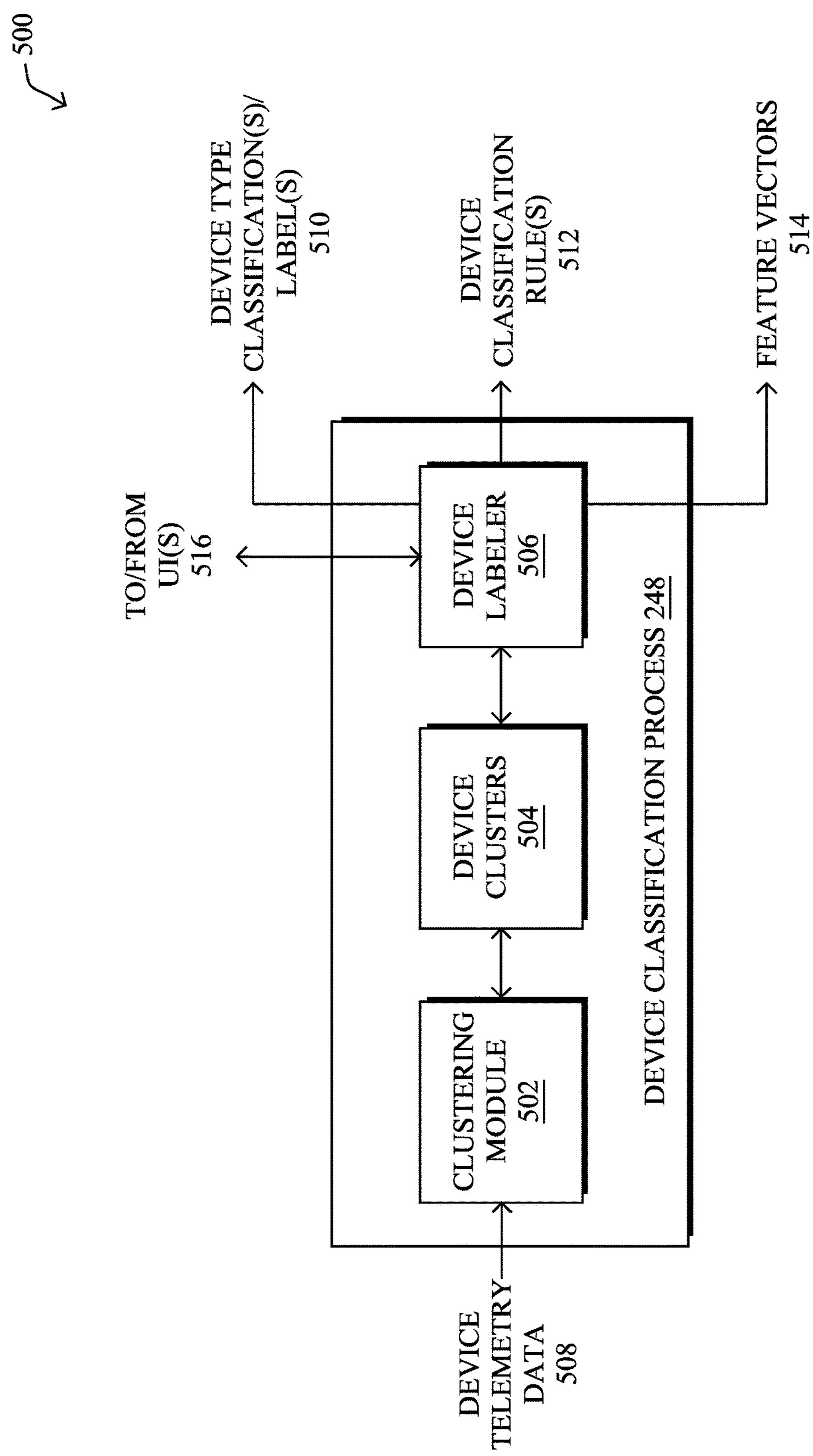
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to one or more user interfaces (UIs) 516, seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors/attributes as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks. etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc.

As noted above, typical device classification systems rely on simple rules and heuristics to classify devices. Those heuristics are not always enough for classifying consumer devices. In fact, such rules often fail on more specific and rarer devices. For example, IoT devices are often difficult to classify, with a multitude of medical or industrial devices and sensors that cannot be identified by traditional systems. For those devices, foolproof rules where one can clearly identify the device type in one of the messages from the device' traffic usually does not exist. More generally, with existing solutions, the number of 'UNKNOWN' devices (e.g., those that do not match any rules from existing device profilers) can be as high as 40%, leaving the network with no information for matching policies to the devices.

When dealing with unknown devices, the main challenge relating to rule generation is to identify the correct granularity at which a rule classifies different types of devices. Granularity here it is to be meant as the level of generality, or conversely, precision, the proposed rule has in describing the devices it is classifying. For example, consider a set of thermometers and laser sensors used to count people moving into, and out of, a building. One possible way to classify such devices could be as general as IoT devices and the corresponding rule may just rely on checking whether the endpoint devices use specific protocols dedicated to IoT communications. A second classification rule could then distinguish between thermometers and laser sensors. Both rules could also integrate activity patterns exhibited by the devices. For example, the thermometers may report data, periodically, whereas the laser sensors may send data predominantly during office hours. A third classification rule could even afford greater granularity, distinguishing between different makes and models of thermometers and laser sensors. Such a rule could consider more information about the precise manufacturers, specific IP addresses reached by the devices, and other fine-grained information. To make the problem even more complex, different users may be interested in different granularities for the same type of device. For example, it might be critical to have a finer grained level of classification for thermometers, pressure sensors, and light sensors in a hospital setting, pressure sensors and light sensors, while the same devices could easily just be classified as 'IoT sensors' in a commercial building.

To recognize new endpoint devices via a device classification system, device classification rules must be created. This can be achieved either: 1.) by the user directly, which is often referred to as "custom user rule creation" or 2.) using the assistance of a machine learning-based system, such as device classification process 248 shown in FIG. 5. In the former case, which is used extensively today, it is assumed that the user knows exactly what rule to create, which is often not scalable or, in many case, not even realistic. In the latter case, data and machine learning techniques can be leveraged to suggest clusters of similar endpoint devices along with rules that can summarize the features/characteristics of those devices, allowing the user to review and approve the suggestions. For instance, device classification process 248 may suggest a device classification rule 512 to a UI 516 regarding a particular device cluster 504, allowing the user to either approve or reject that rule.

In both cases of device classification rule creation, the resulting rule is based on the information that is currently available about the corresponding endpoint devices. For instance, a particular device classification rule 512 may be based on the current device telemetry data 508, which may include various attributes/characteristics of the device obtained via probing, extracted from traffic associated with the endpoint device (e.g., from DHCP/CDP/LLDP/HTTP packets from the endpoint), from internal systems (e.g., an active directory, a mobile device management system, etc.), or from specialized third-party systems (e.g., providing DPI for specific protocols, etc.).

However, not all attributes may be available at all times for a group of endpoint devices. Indeed, some attributes make sense and are available only for some protocols and, hence, some types of endpoint devices. Other types of attributes may take some time to become available, either because that type of traffic may not be present on the network immediately or the integration of the endpoint device with other systems may not be in real-time. Note also that gathering the proper device telemetry data for device type classification also requires the right configuration, such as pointing a wireless LAN controller to send RADIUS account information to the service, setting up specific probes in the network (e.g., for HTTP, etc.), configuring integrations (e.g., for internal systems), and the like.

As a consequence, it is common in real deployments that not all attributes or probes are available in all "parts" of the network. However, configuration issues can be fixed, new systems can be integrated, and attributes may eventually be provided to the device classification service. If a rule has been created for a set of endpoints using only the previously available device telemetry data, though, the new attributes will not be used in classifying these endpoints.

In addition, even if a device type classification rule has already been created, it may be fragile because of the limited number of attributes on which it is based. Historically, many device classification systems use rules that rely on one or more 'fragile' attributes such as the OUI of a device (indicative of the manufacturer of the network chipset, based on the MAC address) and/or its DHCP fingerprints (the sequence according to which certain DHCP options are requested by the DHCP client). Generally, more attributes may be used to provide a more precise characterization of the endpoint devices that is less prone to conflicts or false positives. Similarly, a rule suggested by the system to the user for approval may have been rejected because it was not precise or clear enough. However, without a mechanism to revisit device classification rules, or the decisions to reject a certain rule, performance of the classifications can suffer as new telemetry becomes available.

Revisiting Device Classification Rules Upon Observation of New Endpoint Attributes The techniques herein introduce a system that can monitor existing rules created by a device classification service, or manually by a user, to detect when new attributes could help refine the existing rules. Then, when relevant, the system may suggest changes, in order to update the rule or even try to reclassify a group of endpoint devices. For example, such changes may correspond to a simplification of a rule or refining a rule into more precise sub-rules. In some aspects, these suggestions maybe integrated into active labeling workflows so the user can be involved in providing more precise labels (e.g., when splitting a rule) or reviewing the changes (e.g., when simplifying a rule). As attributes can be very noisy, the system may also evaluate the stability of the attributes, so as to avoid flooding the user with requests to revisit a rule or group of endpoints.

Specifically, according to various embodiments herein, a device classification service uses an initial device classification rule to label each of a set of endpoint devices in a network as being of a particular device type. The device classification service identifies a particular attribute exhibited by at least a portion of the set of endpoint devices and was not previously used to generate the initial device classification rule. The device classification service generates one or more new device classification rules based in part on the particular attribute. The device classification service switches from using the initial device classification rule to label endpoint devices in the network to using the one or more new device classification rules to label endpoint devices in the network.

Illustratively, the techniques described herein may be performed by hardware, software, and/or firmware, such as in accordance with device classification process 248, in conjunction with the rule revision process 249, which may include computer executable instructions executed by the processor 220 (or independent processor of interfaces 210) to perform functions relating to the techniques described herein.

Figure 6:
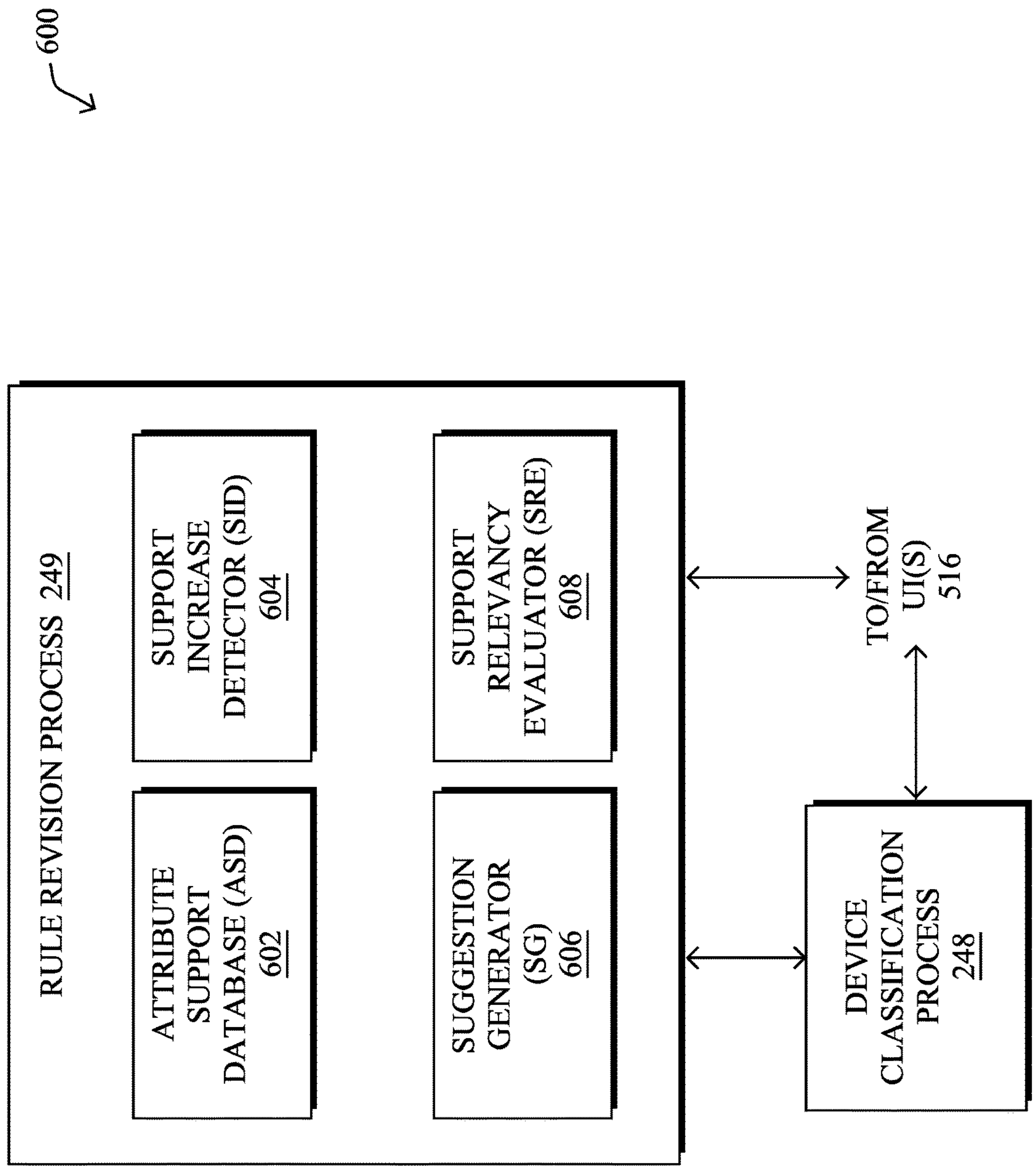
FIG. 6 illustrates an example architecture for revisiting device classification rules upon observation of new endpoint attributes.

Operationally, FIG. 6 illustrates an example architecture 600 for revisiting device classification rules, according to various embodiments. As shown, device classification process 248 may operate in conjunction with rule revision process 249 to provide a device classification service to a network. During execution, rule revision process 249 may generally operate to revisit a device classification rule generated by device classification process 248, such as when new device attributes become available in the network. While processes 248 and 249 are described herein as separate processes, their functionalities can be combined as part of a single process, in further embodiments. In various embodiments, rule revision process 249 may comprise any or all of the following components: an attribute support database (ASD) 602, a support increase detector (SID) 604, a suggestion generator (SG) 606, and/or a support relevancy evaluator (SRE) 608. These components 602-608 may be implemented either on a single device or in a distributed manner, in which case the combined devices may be viewed as a singular device for purposes of implementing the techniques herein. Further, the functionalities of the components of architecture 600 may also be combined, omitted, or implemented as part of other processes, as desired.

In various embodiments, attribute support database (ASD) 602 records the set of device attributes available in the device telemetry data at the time a device classification rule was generated, such as the context provided to the user at the time. This set of attributes is referred to herein as a support. For rules created by device classification process 248 for a given device cluster, this would include all attributes that were available for most of the endpoint devices in the cluster. Note that not all of the attributes may have ended up being used in clauses of the rules. For instance, a device cluster may have endpoint devices for which with attributes such as HTTP User Agent are available, but may ultimately generate a rule that only assesses OUI and DHCP.

For each previously-generated device classification rule, support increase detector (SID) may regularly search for opportunities to suggest a modification to the rule, as new attributes become available, according to various embodiments. More specifically, for each previously created device classification rule, SID 602 may perform any or all of the following:

- Identify the endpoint devices that have recently matched the device classification rule.
- Create a "weighted support"—for each attribute observed for at least one endpoint device, compute the fraction of the endpoint devices matching the rule that have this particular attribute value.
- Compare the weighted support to the support at rule creation as stored in ASD 602. In one embodiment, SID 604 may do so by first thresholding the weighted support and keeping only the attributes present for most endpoint devices, as determined by some static threshold (e.g., 80%).
- Output rules and weighted supports for which the comparison indicates more attributes are available now than at rule creation.

Figure 7:
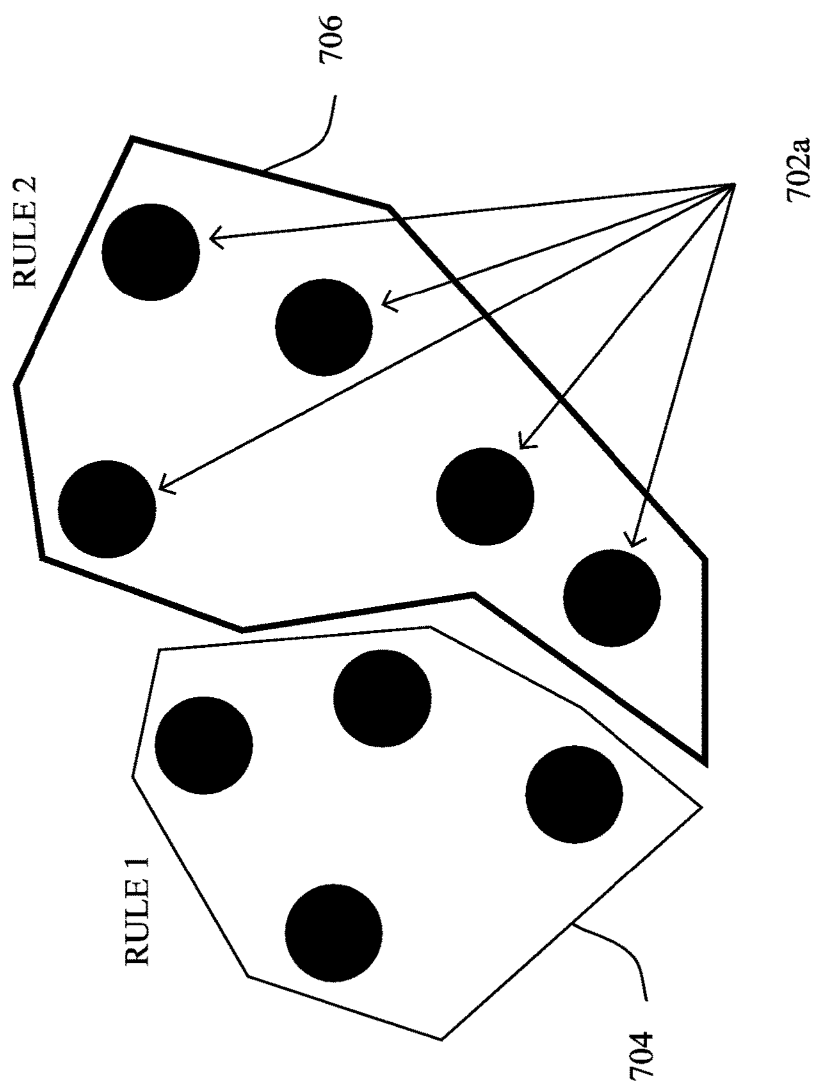
FIG. 7 illustrates an example of device classification rules associated with device type clusters.
Figure 7:
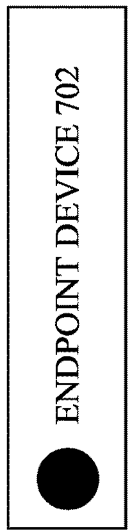

By way of example of the operation of SID 604, FIG. 7 illustrates an example 700 of device classification rules associated with device type clusters, according to various embodiments. As shown, assume that there are endpoint devices 702, each having its own set of attributes observed in the network. Applying clustering to these attributes may result in two device clusters: a first cluster 704 and a second cluster 706. For each of these clusters, a different device classification rule may be generated (e.g., Rule 1 and Rule 2, respectively), based on the attributes of the endpoint devices 702 in that cluster.

Assume that the support for Rule 2 associated with device cluster 706 comprises the following attributes of devices 702*a* in device cluster 706:

OUI
DHCP-Param-Req-List
Ad-Operating-System

However, over the course of time, the set of attributes available for endpoint devices 702*a* changes to being:

OUI
DHCP-Param-Req-List
DHCP-Vendor-Class-ID
Ad-Operating-System
Third-Party-XXX
HTTP-User-Agent As the new device attributes become registered in ASD 602, SID 604 may detect this increase in attributes and look for ways to modify Rule 2, as needed. More specifically, SID 604 may identify those endpoint devices 702*a* that have recently matched Rule 2 and create a weighted support, as described above. Then, if the percentage of those endpoint devices 702*a* matching Rule 2 exhibited any of the new attributes (e.g., DHCP-Vendor-Class-ID) exceeds a predefined threshold (e.g., 80%), SID 604 may output the rule and weighted support for further processing.

Referring again to FIG. 6, suggestion generator (SG) 606 may receive the rules and other information output by SID 604 and interact with device classification process 248 to try and produce a new rule to suggest, according to various embodiments. Depending on the circumstances, SG 606 may suggest either of the following:

Changing the rule: when new attributes are available (i.e., the support has grown), it may be possible to simplify an existing device classification rule. For example, one simplification may be to replace a conjunction of multiple attributes in the rule with a single, more precise one, such as a DPI probe. In such cases, device classification process 248 may train a new rule to try and match the same endpoint devices as the previous rule. In one embodiment, SG 606 may only suggest the new if the new device classification rule is simpler (e.g., less clauses) than the previous rule. In this case, the suggestion consists in the new rule that the user can either accept or reject.

Refining/splitting the rule: when new attributes are available, it may also be possible to classify a sub-group of the matching endpoint devices more precisely. For instance, the existing rule may be used to identify "macOS" devices running the macOS operating system. However, with the new attributes, it may now be possible to also identify specific version of that OS (e.g., some endpoint devices could now be recognized as "macOS 1.2.3" devices). In some embodiments, the notion of being more "precise" may be governed by a policy for SG 606. For example, SG 606 may opt to refine/split a rule if the new rule would capture more classification dimensions (e.g., manufacturer, OS version, device type, etc.) or goes deeper into the decision tree (e.g., "macOS 1.2.3," as opposed to simply "macOS").

In the case of splitting a rule, some endpoint devices matched by the previous rule may now belong to a different label. To this end, device classification process 248 may initiate a new round of clustering, as used in the main active labeling workflow, on all of the endpoint devices matched by the previous rule. This will produce a partition of the endpoint devices into one or multiple device clusters, some of which may have a classification rule that leverages the new attribute(s).

In some instances, SG 606 may provide a device classification rule change suggestion to one or more UI(s) 516 for acceptance or rejection by a user. Such a suggestion may consist of a set of clusters and rule pairs, which are to replace or complement the existing rule. The user of the UI 516 is to review these and individually accept or reject them, possibly providing a more detailed label when relevant. If the user accepts all the rules, then SG 606 will remove the previous rule from use, as the old rule has been fully superseded by a newer set of more precise rules. In some embodiments, if the user accepts only some of the suggested rule changes, the previous rule can be left in the rule set with a lower priority, in order to act as a fallback. For instance, if a device cannot be positively classified as being a "macOS 1.2.3" device using the new rule, the old rule could still be used to classify that device as being a "macOS" device.

Of course, in further embodiments, acceptance of any of the rule changes identified by SG 606 could also be automated. For instance, a user may set one or more parameters, to automatically accept all rule changes or certain types of rule changes, without requiring the user to explicitly accept the changes, first.

Figure 8:
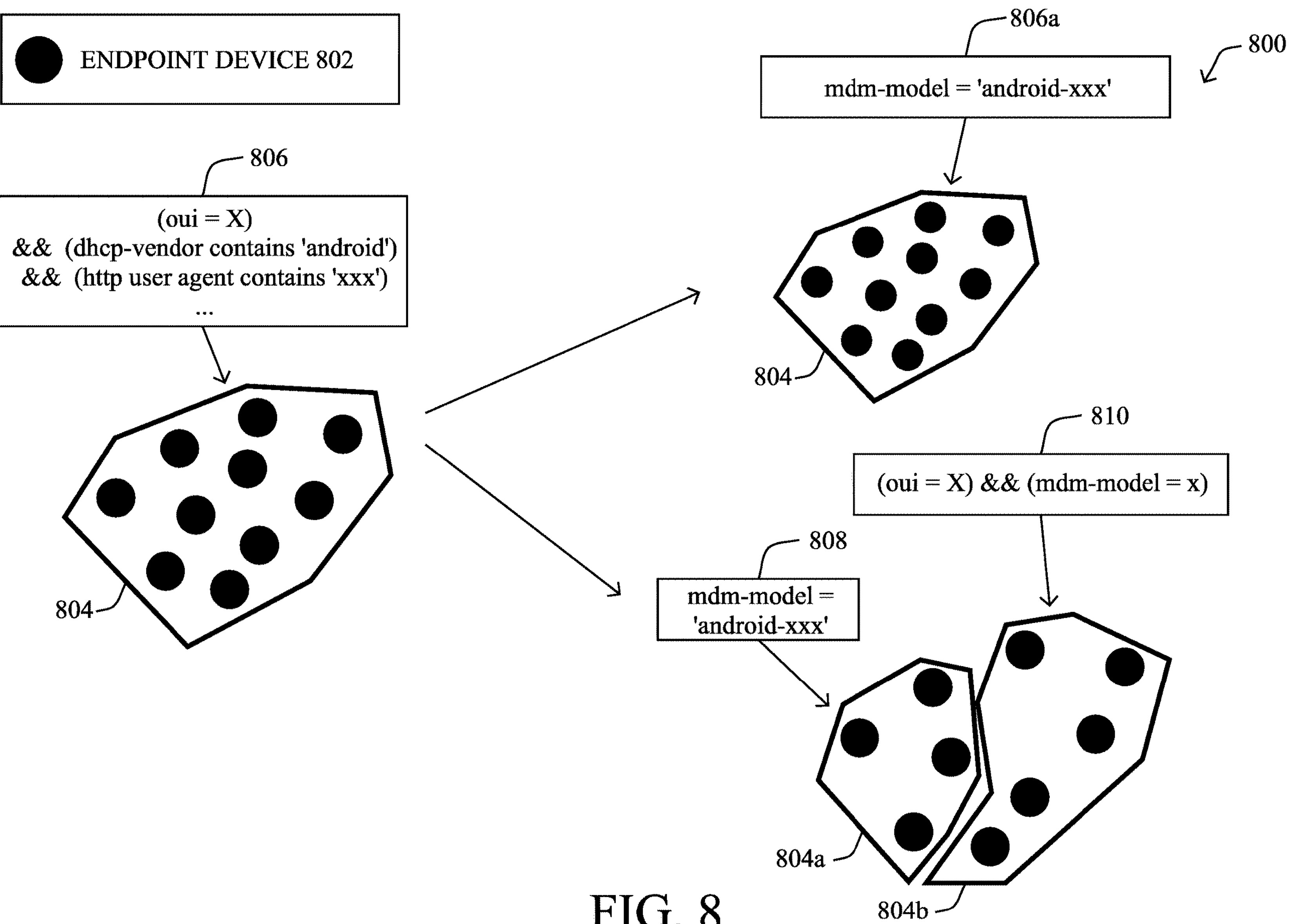
FIG. 8 illustrates an example of updating a device classification rule.

FIG. 8 illustrates an example 800 of updating a device classification rule, according to various embodiments. As shown, assume that endpoint devices 802 have been clustered into a device cluster 804 based on their available attributes. In turn, a device classification rule 806 may be generated for cluster 806 that can be used to label/classify a device if that device exhibits the following conditions:

(oui=*X*)

&&(DHCP-vendor contains 'android')

&&(HTTP user agent contains '*xxx*')

Assume now that a new attribute, mdm-model, also becomes available for at least some of endpoint devices 802 in device cluster 804 after rule 806 was generated. As a result, this may result in a simplification of rule 806 into simplified rule 806*a* that evaluates the following condition:

*mdm*-model='android-*xxx*'

In addition, another potential change to rule 806 may be to split rule 806 into rules 808 and 810. This can be achieved by re-clustering the endpoint devices 802 in device cluster 804 based in part on the new attribute. Consequently, device cluster 804 may be split into two clusters: 804*a* and 804*b*, each having its own associated rule. More specifically, rule 808 for cluster 804*a* may rely on the following condition:

*mdm*-model='android-*xxx*' whereas rule 810 for cluster 804*b* may rely on the following condition:

(OUI=*X*)

&&(*mdm*-model=*x*)

In some embodiments, SG 606 may select between suggesting a rule simplification and a rule refinement/split based on some cost metrics associated with each.

Referring yet again to FIG. 6, the user of a UI 516 may review the suggestions by SG 606 and provide feedback, as described above. In particular, the user may be presented with a single new rule change, as in the case of simplifying an existing rule, or with a set of active labeling clusters to be reviewed and labeled, as in the case of refining/splitting an existing rule. When a suggestion is accepted, the acceptance is integrated into the operation of device classification process 248 so that the change is applied to classification going forward. In addition, the change may be signaled to ASD 602, to store the new support(s) and rule(s), after applying the change.

In various embodiments, architecture 600 may also include support relevance evaluator (SRE) 608 which is used to refine the selection of suggestions by learning relevant attribute additions. Indeed, there may be new attributes that appear over time, but are actually irrelevant from a device classification standpoint. For instance, a lot of network-related attributes may vary depending on the specific context of the endpoint device, such as interfaces used, VLAN information, and the like. To this end, SRE 608 may learn a model of how interesting an additional attribute can be, based on the outcome of the user review. The information is then fed to SG 606 as a way to filter out uninteresting rule notifications from SID 604.

Through the operation of SRE 608, rule revision process 249 can learn to ignore attributes that usually do not lead to any rule improvement. In one embodiment, the model of SRE 608 may take the form of a simple classification model to learn a function of the form:

$$f\text{:(initial support;current weighted support)}\rightarrow\text{probability of being an interesting addition}$$

which estimates, given the initial support and the new support, the probability of the new attributes being interesting. In other words, SRE 608 may learn a model that predicts a relevancy score for a given attribute based on feedback from the user. This allows SRE 608 to make the estimation contextual: e.g., maybe a given attribute is interesting in most cases, unless another attribute is already present. In further embodiments, SRE 608 may leverage a low capacity model (e.g., linear/logistic regression models, possibly with simple kernels) and that model can be trained based on the feedback from the UI 516. In addition, supports can be represented as vectors (e.g., binary for the initial support, in the d-dimensional unit cube for weighted support, where d is the total number of attributes in the system), so that a variety of feature engineering and training/inference techniques could easily be applied.

In yet another embodiment, the level of synchronicity for attributes that have proven to be interesting may be increased using a feedback loop. Such a feedback loop may, for instance, instruct the networking devices responsible for capturing the attributes in the network to adjust how the attributes are collected. For instance, an on-premise networking device that performs packet captures may be instructed to increase the frequency or priority of the data collection of any 'interesting' attributes.

Figure 9:
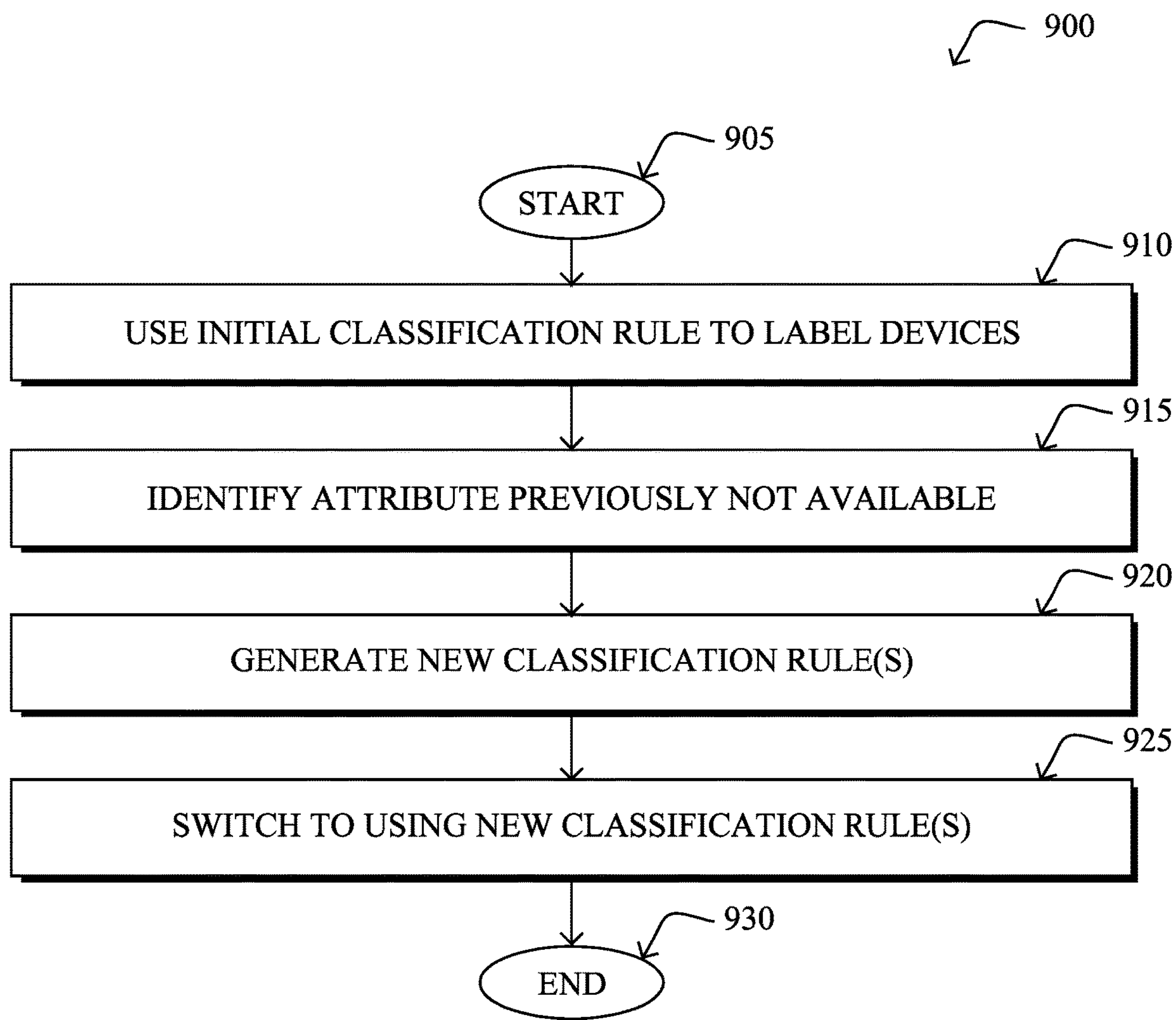
FIG. 9 illustrates an example simplified procedure for adjusting a device classification rule.

FIG. 9 illustrates an example simplified procedure for adjusting a device classification rule, in accordance with one or more embodiments described herein. For example, a non-generic, specifically configured apparatus (e.g., device 200) may perform procedure 900 by executing stored instructions (e.g., processes 248, 249), to provide a device classification service to one or more networks. The procedure 900 may start at step 905, and continues to step 910, where, as described in greater detail above, the device classification service uses an initial device classification rule to label each of a set of endpoint devices in a network as being of a particular device type. In various embodiments, the initial device classification rule may be specified via a user interface or generated automatically by clustering devices by their attributes and selecting one or more of those attributes as conditional clauses.

At step 915, as detailed above, the device classification service may identify a particular attribute exhibited by at least a portion of the set of endpoint devices, wherein the particular attribute was not previously used to generate the initial device classification rule. For instance, the service may maintain a database of device attributes that were used to generate the initial device classification rule. The service may use such a database to identify new device attributes as those attributes are observed in the network or otherwise made available to the device classification service.

At step 920, the device classification service may generate one or more new device classification rules based in part on the particular attribute, as described in greater detail above. In some embodiments, the service may do so by applying clustering to attributes associated with the set of endpoint devices, the attributes including the particular attribute and one more attributes on which the initial device classification rule was based. In further embodiments, the service may compute a weighting for the particular attribute based on a fraction of the endpoint devices exhibiting the particular attribute to the set of endpoint devices and generate the one or more new device classification rules based on the weighting.

At step 925, as detailed above, the device classification service may switch from using the initial device classification rule to label endpoint devices in the network to using the one or more new device classification rules to label endpoint devices in the network. In some embodiments, the one or more new device classification rules comprise a device classification rule that has a more granular device type label than that of the initial device classification rule or comprise a rule that has fewer conditional clauses than that of the initial device classification rule. In further embodiments, the service may suggest the one or more new rules via a user interface and receive an acceptance of the one or more rules via the user interface. In another embodiment, the service may use the acceptance as feedback for a machine learning model that predicts an attribute relevancy score. Such a score can be used to stop suggesting rule changes involving the particular attribute, if the user rejects the rule change, for instance. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for device type classification rules to be revisited as new device attributes become available in the network. For example, such attributes may become available over time due to configuration changes in the network, improvements, or when new third-party systems are integrated. In some aspects, the techniques herein can be used to simplify an existing rule or even, in some cases, divide a classification rule to provide a greater degree of granularity in the classification.

While there have been shown and described illustrative embodiments that provide for revisiting device classification rules upon observation of new endpoint attributes, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

using, by a device classification service, an initial device classification rule to label each of a set of endpoint devices in a network as being of a particular device type;

identifying, by a device classification service, a particular attribute exhibited by at least a portion of the set of endpoint devices, wherein the particular attribute was not previously used to generate the initial device classification rule;

generating, by the device classification service, one or more new device classification rules based in part on the particular attribute; and switching, by the device classification service, from using the initial device classification rule to label endpoint devices in the network to using the one or more new device classification rules to label endpoint devices in the network.

2. The method as in claim 1, further comprising:

maintaining, by the device classification service, a database of device attributes that were used to generate the initial device classification rule.

3. The method as in claim 1, wherein switching from using the initial device classification rule to label endpoint devices in the network to using the one or more new device classification rules to label endpoint devices in the network comprises:

suggesting, via a user interface, the one or more new device classification rules; and receiving, via the user interface, an acceptance of the one or more new device classification rules.

4. The method as in claim 3, further comprising:

using the acceptance as feedback for a machine learning model that predicts an attribute relevancy score.

5. The method as in claim 1, wherein generating the one or more new device classification rules based in part on the particular attribute comprises:

applying clustering to attributes associated with the set of endpoint devices, the attributes including the particular attribute and one more attributes on which the initial device classification rule was based.

6. The method as in claim 1, further comprising:

computing, by the device classification service, a weighting for the particular attribute based on a fraction of the endpoint devices exhibiting the particular attribute to the set of endpoint devices, wherein the device classification service generates the one or more new device classification rules based on the weighting.

7. The method as in claim 1, wherein the one or more new device classification rules comprise a device classification rule having fewer conditional clauses than that of the initial device classification rule.

8. The method as in claim 1, wherein the one or more new device classification rules comprise a device classification rule that has a more granular device type label than that of the initial device classification rule.

9. The method as in claim 1, further comprising:

sending an instruction to one or more networking devices in the network to increase collection of the particular attribute in the network.

10. The method as in claim 1, wherein the initial device classification rule comprises one or more conditional clauses, each clause corresponding to a different device attribute.

11. An apparatus, comprising:

one or more network interfaces;

a processor coupled to the one or more network interfaces and configured to execute one or more processes; and a memory configured to store a process that is executable by the processor, the process when executed configured to:

use an initial device classification rule to label each of a set of endpoint devices in a network as being of a particular device type;

identify a particular attribute exhibited by at least a portion of the set of endpoint devices, wherein the particular attribute was not previously used to generate the initial device classification rule;

generate one or more new device classification rules based in part on the particular attribute; and switch from using the initial device classification rule to label endpoint devices in the network to using the one or more new device classification rules to label endpoint devices in the network.

12. The apparatus as in claim 11, wherein the process when executed is further configured to:

maintain a database of device attributes that were used to generate the initial device classification rule.

13. The apparatus as in claim 11, wherein the apparatus switches from using the initial device classification rule to label endpoint devices in the network to using the one or more new device classification rules to label endpoint devices in the network by:

suggesting, via a user interface, the one or more new device classification rules; and receiving, via the user interface, an acceptance of the one or more new device classification rules.

14. The apparatus as in claim 13, wherein the process when executed is further configured to:

use the acceptance as feedback for a machine learning model that predicts an attribute relevancy score.

15. The apparatus as in claim 11, wherein the apparatus generates the one or more new device classification rules based in part on the particular attribute by:

applying clustering to attributes associated with the set of endpoint devices, the attributes including the particular attribute and one more attributes on which the initial device classification rule was based.

16. The apparatus as in claim 11, wherein the process when executed is further configured to:

compute a weighting for the particular attribute based on a fraction of the endpoint devices exhibiting the particular attribute to the set of endpoint devices, wherein the device classification service generates the one or more new device classification rules based on the weighting.

17. The apparatus as in claim 11, wherein the one or more new device classification rules comprise a device classification rule having fewer conditional clauses than that of the initial device classification rule.

18. The apparatus as in claim 11, wherein the one or more new device classification rules comprise a device classification rule that has a more granular device type label than that of the initial device classification rule.

19. The apparatus as in claim 11, wherein the process when executed is further configured to:

send an instruction to one or more networking devices in the network to increase collection of the particular attribute in the network.

20. A tangible, non-transitory, computer-readable medium storing program instructions that cause a device classification service to execute a process comprising:

using, by the device classification service, an initial device classification rule to label each of a set of endpoint devices in a network as being of a particular device type;

identifying, by a device classification service, a particular attribute exhibited by at least a portion of the set of endpoint devices, wherein the particular attribute was not previously used to generate the initial device classification rule;

generating, by the device classification service, one or more new device classification rules based in part on the particular attribute; and switching, by the device classification service, from using the initial device classification rule to label endpoint devices in the network to using the one or more new device classification rules to label endpoint devices in the network.

* * * * *